United States Patent
Mizusawa et al.

(10) Patent No.: US 6,999,002 B2
(45) Date of Patent: Feb. 14, 2006

(54) PARKING OPERATING ASSISTING SYSTEM

(75) Inventors: Kazufumi Mizusawa, Kanagawa (JP);
Syusaku Okamoto, Kanagawa (JP);
Yuichi Hirama, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/484,898

(22) PCT Filed: Mar. 24, 2003

(86) PCT No.: PCT/JP03/03532

§ 371 (c)(1),
(2), (4) Date: Jan. 26, 2004

(87) PCT Pub. No.: WO03/084783

PCT Pub. Date: Oct. 16, 2003

(65) Prior Publication Data

US 2004/0201670 A1    Oct. 14, 2004

(30) Foreign Application Priority Data

Apr. 5, 2002    (JP)    ............................ P2002-103804

(51) Int. Cl.
*B60Q 1/48*    (2006.01)
(52) U.S. Cl. .................... 340/932.2; 348/118
(58) Field of Classification Search ............ 340/932.2; 280/761; 180/199; 701/1, 41; 348/113, 348/118, 119, 148
See application file for complete search history.

(56) References Cited

U.S. PATENT DOCUMENTS

| | | | |
|---|---|---|---|
| 5,646,614 A * | 7/1997 | Abersfelder et al. ..... 340/932.2 |
| 6,366,221 B1 * | 4/2002 | Iisaka et al. ............. 340/932.2 |
| 6,476,730 B1 * | 11/2002 | Kakinami et al. ........ 340/932.2 |
| 6,483,429 B1 * | 11/2002 | Yasui et al. ................. 340/435 |
| 6,483,442 B1 * | 11/2002 | Shimizu et al. .......... 340/932.2 |
| 6,487,481 B1 * | 11/2002 | Tanaka et al. ................ 701/41 |
| 6,587,760 B1 * | 7/2003 | Okamoto ....................... 701/1 |
| 6,621,421 B1 * | 9/2003 | Kuriya et al. ............ 340/932.2 |
| 6,657,555 B1 * | 12/2003 | Shimizu et al. .......... 340/932.2 |
| 6,711,473 B1 * | 3/2004 | Shimazaki et al. ............ 701/1 |
| 6,778,891 B1 * | 8/2004 | Tanaka et al. ................ 701/41 |
| 6,825,880 B1 * | 11/2004 | Asahi et al. ........... 348/333.02 |

FOREIGN PATENT DOCUMENTS

JP    2001-180405    7/2001

\* cited by examiner

*Primary Examiner*—Jeffery Hofsass
*Assistant Examiner*—George Bugg
(74) *Attorney, Agent, or Firm*—Pearne & Gordon LLP

(57) ABSTRACT

An object of the present invention is to provide a parking assistance system capable of intuitively and easily deciding operation points in the parallel parking.

In the parking assistance system according to the present invention, a guide line (43), which is extended from a vehicle (20) in an oblique backward direction and indicates a boundary line used to decide whether or not the vehicle touches other vehicle (31) existing in front of a parking space (30) when parallel parking operations are started, and a guide line (51), which is separated backward from the guide line (43) and indicates another boundary line used to decide whether or not the vehicle touches other vehicle (53) existing at rear of the parking space (30) when the parallel parking operations are completed, are decided previously, and these guide lines as well as a backward picked-up image are displayed on a monitor screen in the parallel parking. Accordingly, the vehicle can be parked on the parking space (30) not to touch other vehicles (31), (53).

5 Claims, 10 Drawing Sheets

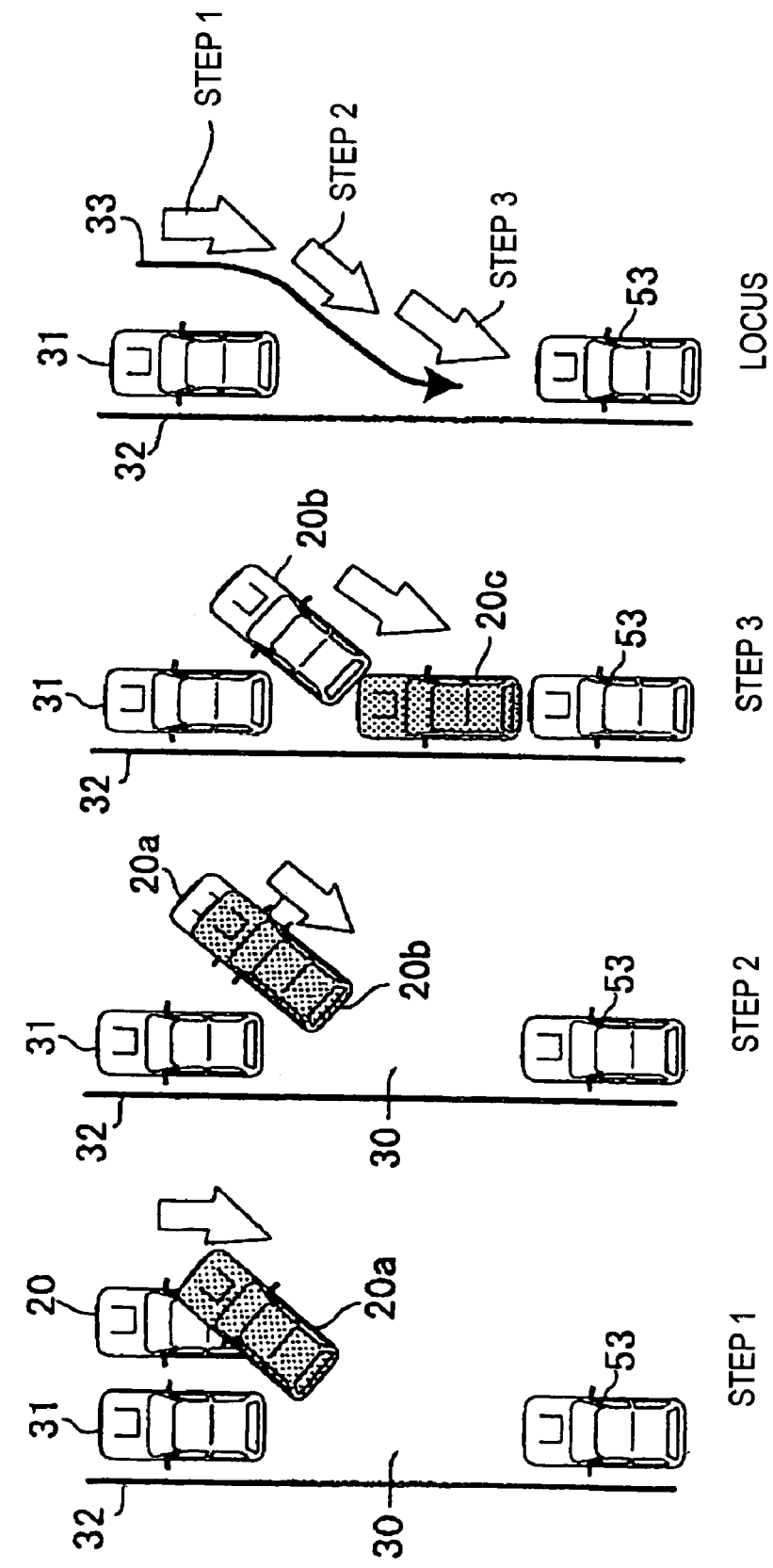

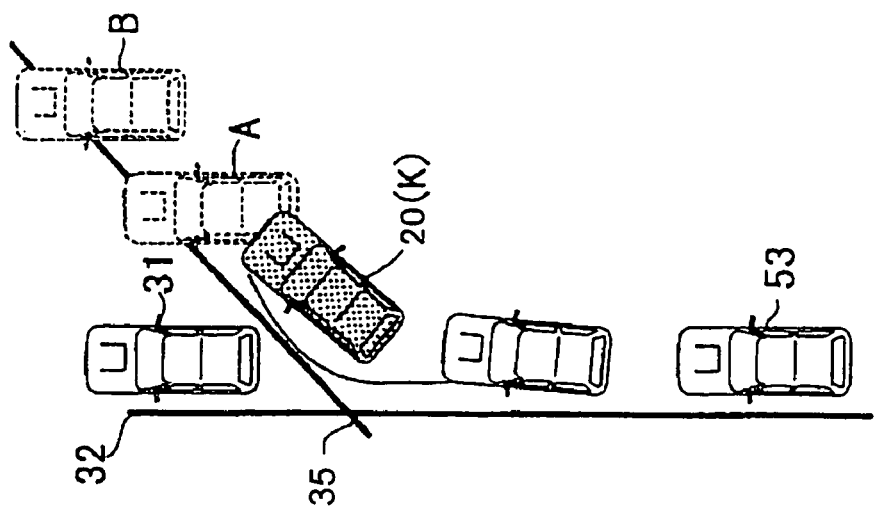
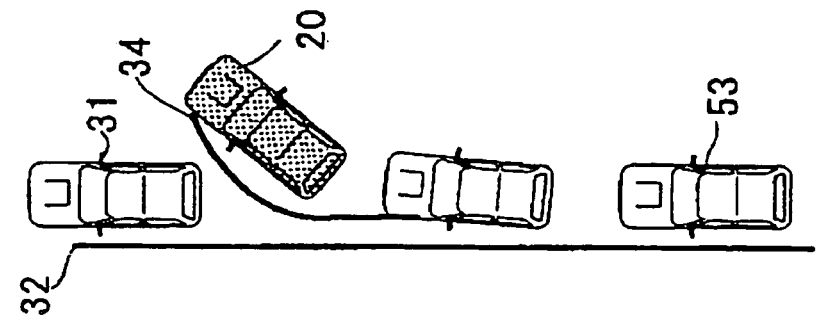
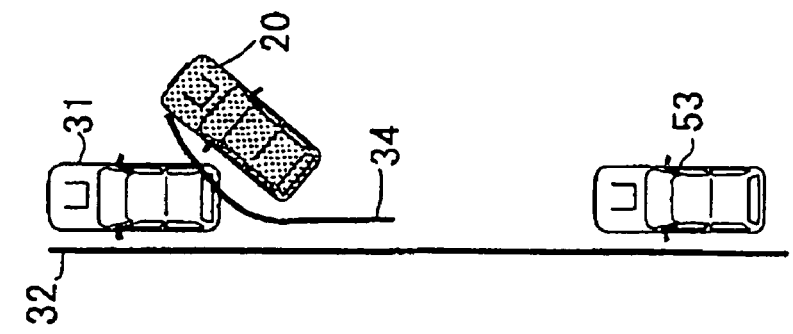
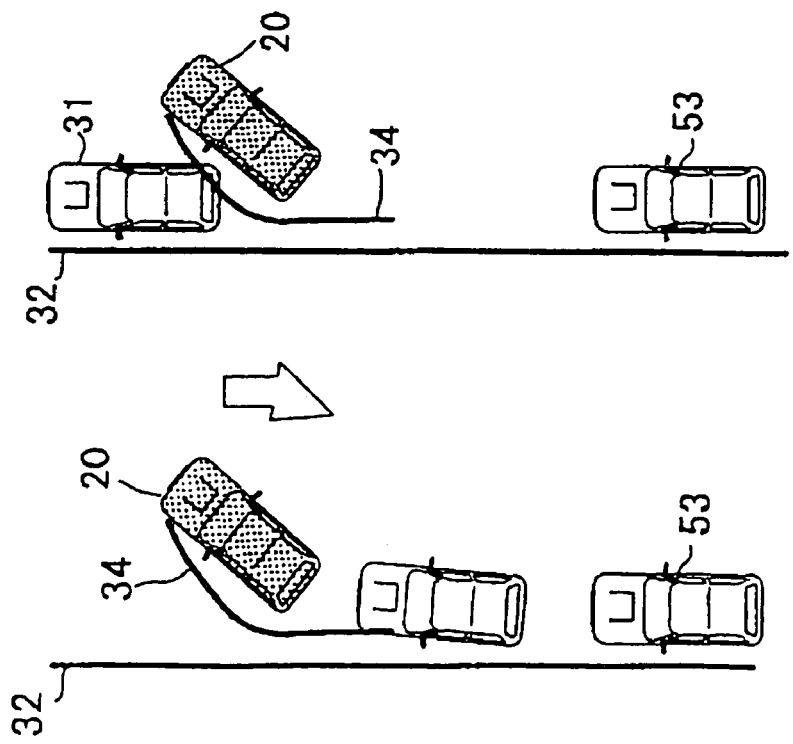

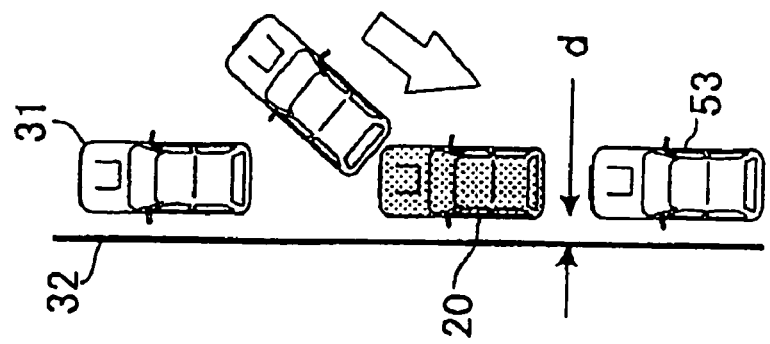
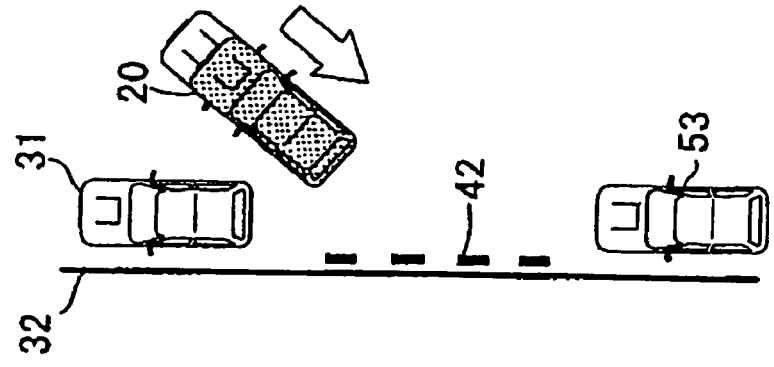
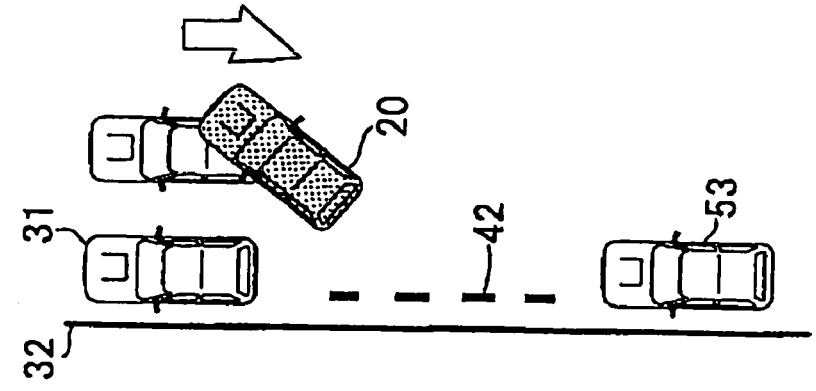
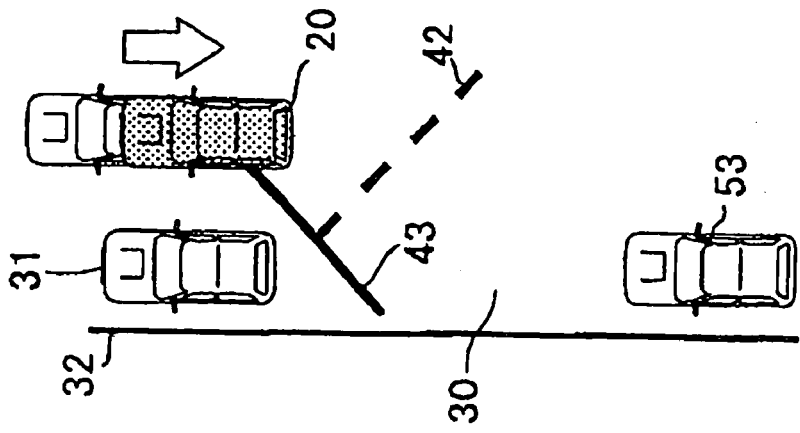

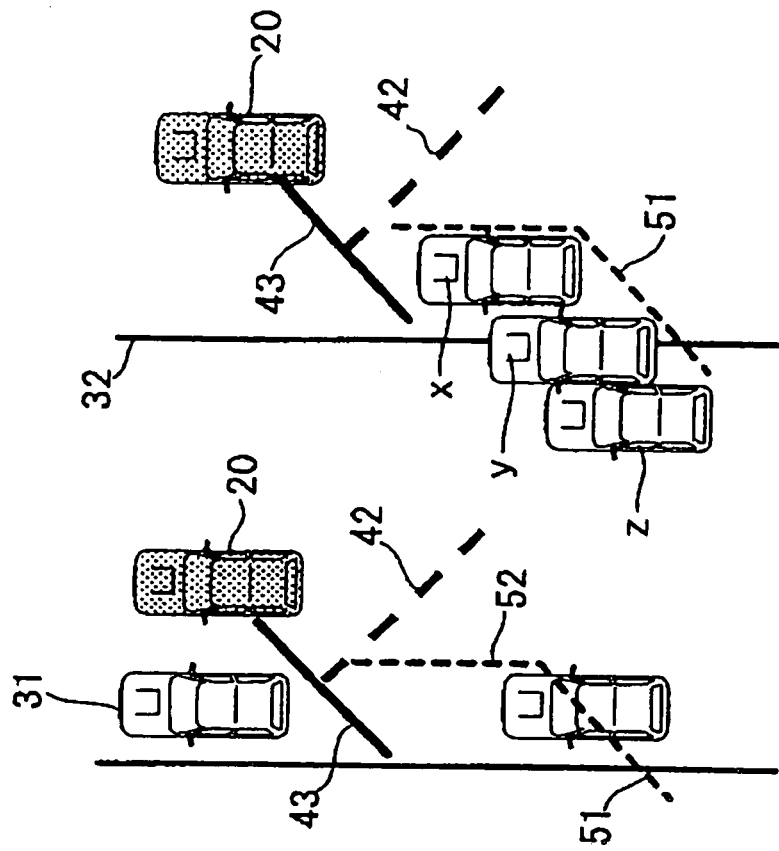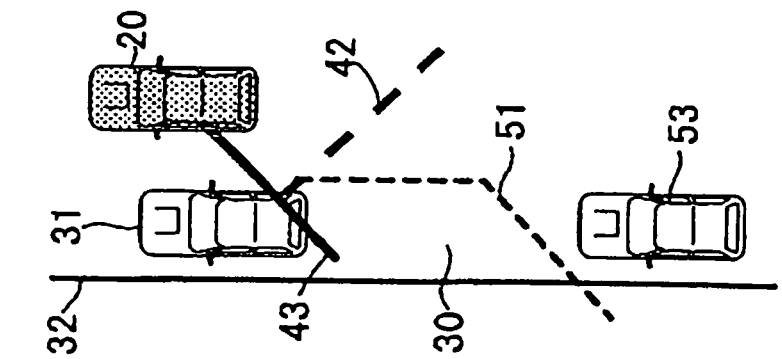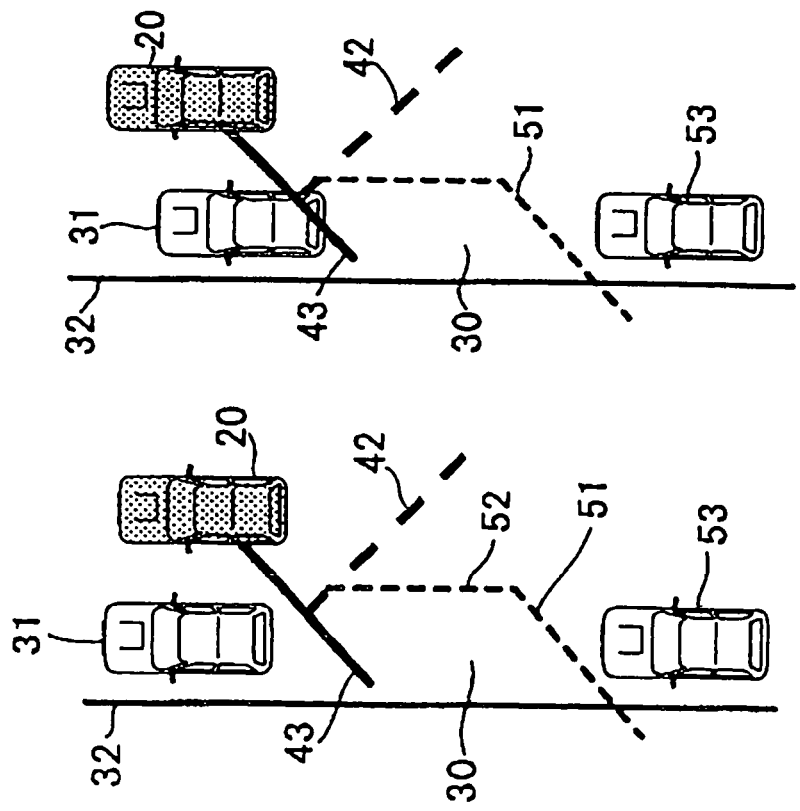

PARKING OPERATING ASSISTING SYSTEM

TECHNICAL FIELD

The present invention relates to a parking assistance system which assists parking by picking up an image on the rear side of a vehicle by an equipped camera to display the image on a monitor screen that can be viewed from a driver's seat, and more particularly, to a parking assistance system which displays guidance that is effective for a parallel parking on the monitor screen in a superposed manner.

BACKGROUND ART

A driving assistance system for providing a state of a rear side of a vehicle to the driver by installing backward an equipped camera into a rear portion of a vehicle and displaying an image picked up by the camera on a monitor screen provided near a driver's seat is spreading nowadays. At this time, a parking assistance system having a function of assisting the parking operation of the driver by superposing/displaying various guidance as a clue of the parking operation on the monitor screen appears.

For example, in the parking assistance system set forth in JP-A-2001-180405, a locus line of a particular portion such as a front left corner portion, or the like of driver's own vehicle is superposed/displayed on the monitor screen such that the driver can decide easily whether or not driver's own vehicle comes into contact with the obstacle such as the surrounding vehicle, etc. during the parking operation. FIG. 12 is a view showing an example of a screen construction of the parking assistance system set forth in JP-A-2001-180405 in the related art. The related art will be explained with reference to FIG. 12 hereunder.

In this related art, guides 2, 3 indicating a vehicle width of driver's own vehicle in the straight backing, guides 4, 5 indicating rear ends of the guides 2, 3 respectively, and guides 6, 7 indicating predetermined rear positions inclined leftward and rightward from driver's own vehicle respectively are displayed on a monitor screen 1 that displays the image on the rear side of the vehicle. In addition, in this related art, a steered-amount guide 8 (an inner frame of a double rectangular display in FIG. 12) which moves in response to a steering angle along the guides 6, 7 (the guide 6 in this illustration) is also displayed.

When the driver carries out the parallel parking while monitoring this monitor screen 1, at first the driver backs straight driver's own vehicle in parallel with the road, and then stops own vehicle at a point of time when the guide 6 overlaps with a target point S1 in a target parking space T (an outer frame of the double rectangular display in FIG. 12). Then, the driver turns the steering wheel until a steered-amount guide 41 almost overlaps with the target parking space T on the monitor screen 1 (FIG. 12 shows the state that the steered-amount guide 41 overlaps with the target parking space T). Then, when both overlaps with each other, the driver further backs driver's own vehicle while maintaining the steering angle as it is.

At this time, the parking assistance system displays a locus line 9 of a front left corner portion of driver's own vehicle on the monitor screen 1. Because this locus line 9 is displayed on the monitor screen 1, the driver can see whether or not the front left corner portion of driver's own vehicle is going to interfere with an obstacle (image 10) in the middle of the route to the target parking space T when he or she parks his or her own vehicle in parallel with the left side of the road.

Then, the driver backs driver's own vehicle while holding the steering angle of the steering wheel, and then stops driver's own vehicle when the guide 5 comes up to the position of the target point S1. Then, the driver turns the steering wheel in the opposite direction to its maximum as the steer without driving, and then backs driver's own vehicle. The operations required for the parallel parking are completed when the guide 2 of the vehicle width is positioned in parallel with a side line 11 of the road.

In the case that the parallel parking is carried out by using the above parking assistance system in the related art, the driver can know previously whether or not driver's own vehicle comes into contact with the neighboring vehicle, based on the locus line 9 of the front left corner portion of driver's own vehicle being displayed on the monitor screen.

However, in the parking assistance system of the related art, a sensor for sensing the steering angle, a steering signal receiving portion, a predictive locus computing portion, etc. must be equipped to display the locus line 9 with good precision. Therefore, such a problem existed that a construction cost is increased.

Also, in the parking assistance system of the related art, there existed such a problem that, when the locus line 9 overlaps with the obstacle and driver's own vehicle touches the obstacle if the parking operation is continued as it is, the driver must search the position, at which the locus line 9 does not overlap with the obstacle, every time by correcting the parking operation starting position of driver's own vehicle many times.

In addition, since the image on the rear side of the vehicle displayed on the monitor screen is an image picked up by a wide-angle camera, such image is displayed smaller and distorted larger as the position becomes more distant from the rear side of the vehicle. Therefore, it is difficult to decide with high precision whether or not the guide 6 coincides with the target position S1 shown in FIG. 12. As a result, such a problem existed that it is difficult to park driver's own vehicle on the target parking space T with good precision.

An object of the present invention is to provide a parking assistance system for displaying guidance, which makes it possible for the driver to intuitively decide a possibility of contact of a front left or right corner portion of driver's own vehicle with a surrounding vehicle or an obstacle and exactly decide a steering point of a steering wheel during a parallel parking, on a monitor screen.

Another object of the present invention is to provide a parking assistance system for displaying guidance with high safety, which makes it possible to improve an operability and easily decide a possibility of contact of a front left corner portion (or a front right corner portion) of driver's own vehicle with a surrounding vehicle or an obstacle during a left-side (or right-side) parallel parking by limiting a parking operation to a straight backing operation or a backing operation in the condition that a steering wheel is always turned to its maximum, on a monitor screen.

DISCLOSURE OF INVENTION

In order to attain the above object, a parking assistance system of the present invention has imaging means for picking up a backward image of a vehicle; monitoring means for displaying an image picked up by the imaging means; and controlling means for superposing an image of a tangent line of a boundary line of an area through which the vehicle may pass when a steering wheel of the vehicle is operated, or a line which is at a predetermined distance outward from the tangent line as a first guide to display on the monitoring means.

According to this configuration, since a positional relationship between the linear guide and the surrounding obstacle can be grasped simply, the driver can decide whether or not the contact is brought about only by looking at the monitor screen, and the driver can exactly and easily decide a starting point of the steering operation.

Also, the controlling means of the present invention includes means for superposing an image of a second guide line which has an inclination angle opposite in direction to an inclination angle of the first guide with respect to a center line in a longitudinal direction of the vehicle, or a line which is at a predetermined distance from the second guide line in direction apart from the vehicle to display on the monitoring means.

According to this configuration, the driver can exactly and easily decide a possibility of contact to the obstacle and the starting point of the steering operation. In addition, the driver can easily decide the subsequent turning point by using the straight line guide.

Also, the area of the present invention through which the vehicle may pass is an area through which a front left corner portion of the vehicle may pass when the vehicle parks in parallel on a left side, and an area through which a front right corner portion of the vehicle may pass when the vehicle parks in parallel on a right side.

According to this configuration, the driver can previously decide a possibility of contact of the front corner portion of the vehicle visually, that the driver cannot directly check by the picked-up image on the display screen and must mostly take care, by the monitor screen. In addition, the driver can exactly decide the starting point of the steering operation.

Also, the area of the present invention through which the vehicle may pass is an area through which the vehicle passes when a steering wheel is turned at a maximum steering angle. According to this configuration, the steering operations during the parking operations are restricted to three operations of the straight driving and the operation for turning the steering wheel rightward or leftward to its maximum, and the parking operations are simplified. Also, since the operation at a maximum steering angle is used as a premise, it is made easy to give a predetermined margin to the guides.

Also, a parking assistance system of the present invention has imaging means for picking up a backward image of a vehicle; monitoring means for displaying an image picked up by the imaging means; and controlling means for superposing an image of a tangent line of a boundary line of an area through which the vehicle may pass when a steering wheel of the vehicle is operated, or a line which is at a predetermined distance outward from the tangent line as a first guide to display on the monitoring means, and also superposing a second guide which is at a distance of one vehicle space backward from the first guide to display on the monitoring means.

According to this configuration, the driver can know prior to the start of the parking operation whether or not the vehicle can be parked actually on the target parking space.

Also, a parking assistance system of the present invention has imaging means for picking up a backward image of a vehicle; monitoring means for displaying an image picked up by the imaging means; and controlling means for superposing a guide line, which extends from the vehicle in an oblique backward direction, to be a boundary line indicating a criterion used to decide whether or not the vehicle touches an obstacle existing in front of a parking space when parallel parking operations are started on the picked-up image displayed on the monitoring means to display the superposed image on the monitoring means.

According to this configuration, the driver can decide the position at which the guide line is apart from the image of other vehicle on the monitor screen as the starting position of the parallel parking operations when the driver is straight backing the driver's own vehicle while keeping the driver's own vehicle in parallel with other vehicle parked in the parallel parking. The driver can park the driver's own vehicle without contact to the neighboring vehicle by turning the steering wheel from the starting position in the parallel parking operations. Since the guide line can be previously decided uniquely, a steering sensor and locus computing means are omitted and the parking assistance system can be constructed at a low cost.

Also, a parking assistance system of the present invention has imaging means for picking up a backward image of a vehicle; monitoring means for displaying an image picked up by the imaging means; and controlling means for superposing a first boundary line, which extends from the vehicle in an oblique backward direction, indicating a criterion used to decide whether or not the vehicle touches an obstacle existing in front of a parking space when parallel parking operations are started, and a second boundary line, which is apart backward from the first boundary line, indicating a criterion used to decide whether or not the vehicle touches an obstacle existing at rear of the parking space when the parallel parking operations are completed on the picked-up image displayed on the monitoring means to display the superposed image on the monitoring means.

According to this configuration, the driver can easily decide the starting point of the parallel parking operations like the above and can easily decide prior to the parking operations whether or not the driver's own vehicle can be parked actually on the space on which the driver wants to park the driver's own vehicle. Also, since the first guide line and the second guide line can be previously decided uniquely like the above, the steering sensor and the locus computing means are omitted and the parking assistance system can be constructed at a low cost.

Also, boundary lines of the present invention used to decide whether or not the vehicle touches the obstacle are defined by specifying a steering angle of a steering operation executed in the parallel parking operations to a maximum steering angle. According to this configuration, the steering operations during the parking operations are confined to three operations of the straight driving and the operation for turning the steering wheel rightward or leftward to its maximum, and the parking operations are simplified.

Also, the controlling means of the present invention superposes an auxiliary guide line to be a criterion which is used when the vehicle straight backs in an oblique direction to a side line of a parking space in the parallel parking operations to display on the monitoring means. According to this configuration, it is made easy to decide to what extent the straight backing executed on the way of the parallel parking operations must be carried out, and it is made easy to park the vehicle on the optimal final parking position.

Also, the controlling means of the present invention superposes another guide line, which has a margin of a predetermined distance from the guide line in a direction apart from the vehicle, in place of the guide line, to display on the monitoring means. According to this configuration, the contact to other vehicle can be avoided with a margin, and the parking operations can be carried out with a sense of security.

BRIEF DESCRIPTION OF DRAWINGS

FIGS. 2A to 2D are explanatory views showing parallel parking procedures employed in the parking assistance system according to the first embodiment of the present invention;

FIGS. 3A to 3D are explanatory views showing the guidance used in the parking assistance system according to the first embodiment of the present invention;

FIGS. 7A to 7D are explanatory views showing parallel parking procedures employed in the parking assistance system according to the second embodiment of the present invention;

FIGS. 9A to 9D are explanatory views showing the guidance used in the parking assistance system according to the third embodiment of the present invention;

Figure 1:
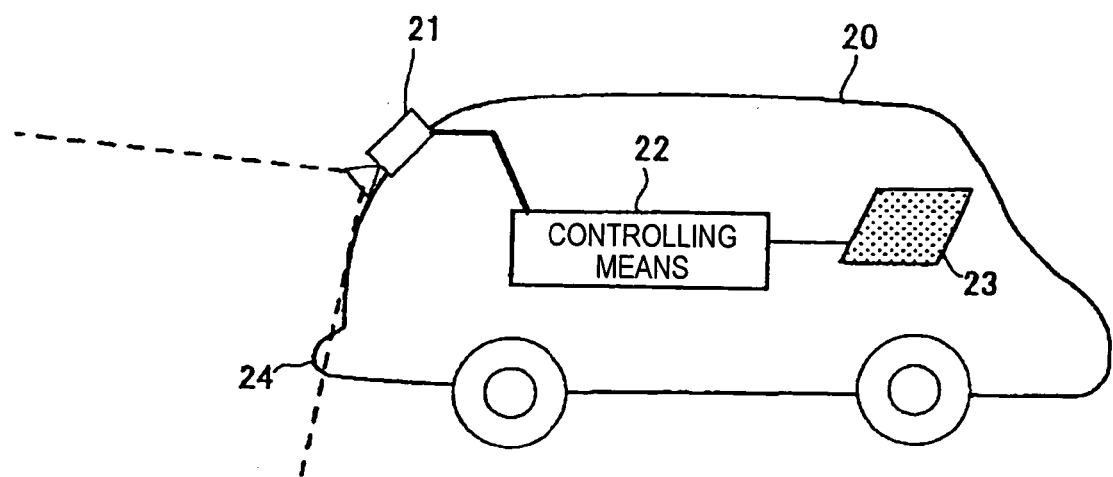
FIG. 1 is a configurative block diagram showing a parking assistance system according to a first embodiment of the present invention.

In Figures, a reference numeral 20 is driver's own vehicle, 21 is a camera, 22 is a controlling means, 23 is a monitor device, 31, 53 are other vehicles, 31a is an image of other vehicle, 32 is a side line of a parking lot or a side line of a road, 36 is a monitor screen, 35, 42, 43, 51, 52 are guide lines, and 35a, 42a, 43a, 51a, 52a are images of the guide lines.

BEST MODE FOR CARRYING OUT THE INVENTION

Embodiments of the present invention will be explained with reference to the drawings hereinafter.

(First Embodiment)

FIG. 1 is a configurative view showing a vehicle into which a parking assistance system according to a first embodiment of the present invention is installed. This parking assistance system has a camera 21 for picking up an image on the rear side of driver's own vehicle 20, a controlling means 22 provided in an inside of driver's own vehicle 20, and a monitor device 23 provided at a position that can be viewed from a driver's seat. The controlling means 22 operates to superpose respective guides described later on the image picked up by the camera 21 and display a resultant image on a screen of the monitor device 23. As the monitor device 23, a liquid crystal display screen used as a car navigation system, or the like may be employed. The camera 21 should be installed into the position, at which the camera 21 can catch an image of a rear bumper 24 of driver's own vehicle 20 within an imaging angle of view, to pick up the image on the rear of driver's own vehicle 20.

FIGS. 2A to 2D are views explaining parking procedures usually executed by the normal person when he or she parks his or her own vehicle in parallel with the left side of the road. When the driver is going to perform the parallel parking, at first a driver stops the driver's own vehicle 20 in parallel with other vehicle 31 that is parked in front of a parking space 30, as shown in FIG. 2A. This is a parking starting position of the parallel parking.

The driver turns the steering wheel of the driver's own vehicle 20 leftward from this state, and then backs the driver's own vehicle up to an appropriate position (driver's own vehicle position indicated by a reference 20a in FIG. 2A) while fixing the steering angle constant. Normally, the driver backs the driver's own vehicle until the driver's own vehicle 20 is inclined by 20 to 45 degrees or about several tens degrees to the direction of the road. This parking step is referred to as step 1 hereinafter.

After step 1, as shown in FIG. 2B, the driver returns the steering wheel to the straight drive and then further backs straight up to an appropriate position (driver's own vehicle position indicated by a reference 20b in FIG. 2B). This parking step is referred to as step 2 hereinafter.

As next parking step, as showing in FIG. 2C, the driver turns the steering wheel rightward, and then backs the driver's own vehicle while fixing the steering angle constant up to a position at which the driver's own vehicle is positioned in parallel with a road side line 32 or a side line of the parking space 30 (driver's own vehicle position indicated by a reference 20c in FIG. 2C). Thus, the parallel parking is completed. This parking step is referred to as step 3 hereinafter.

FIG. 2D is a view showing a vehicle locus 33 when the parking steps are carried out continuously via step 1, step 2, and step 3. A straight backing distance executed in step 2 is different depending on a distance between the parking starting position and the adjacent other vehicle 31. In some cases, this straight backing distance in step 2 is seldom needed and thus step 2 is omitted.

When the driver backs the driver's own vehicle by turning the steering wheel rightward in step 3 in a series of parking operations, the driver must observe whether or not the driver's own vehicle 20 comes into contact with other vehicle 31 that is parked in front of the parking space 30. This is because a front portion of the driver's own vehicle 20 is largely swung leftward and comes close to other vehicle 31 when step 3 is executed. However, the driver's attention is paid to other vehicle 53 that is parked on the rear side at this time, and thus the driver must direct his or her attention to both contacts on the front and rear sides of the driver's own vehicle.

FIGS. 3A to 3D are views explaining procedures indicating how the parking assistance system according to the first embodiment of the present invention should guide the parallel parking.

A vehicle locus 34 shown in FIG. 3A is a locus line showing a boundary line in an area through which the front left corner portion of the driver's own vehicle 20 passes when step 3 is executed, and traces a leftwards convex circular arc. As shown in FIG. 3B, if other vehicle 31 is parked on this vehicle locus 34, the driver's own vehicle 20 touches other vehicle 31 when step 3 is executed. However, as shown in FIG. 3C, if other vehicle 31 is not parked on this vehicle locus 34, the driver can park the driver's own vehicle 20 in a target parking space not to bring his or her own vehicle into contact with other vehicle 31.

Therefore, in the present embodiment, as shown in FIG. 3D, out of tangent lines to this vehicle locus 34 along which the front left corner portion of the driver's own vehicle 20 passes when the driver backs the driver's own vehicle while turning rightward the steering wheel to its maximum in step 3, a guide line 35 that is parallel with the straight backing direction in step 2 is previously decided and stored into a memory (not shown) in the controlling means 22. Then, this guide line 35 is superposed on the images picked up by the camera 21 and displayed as a guide line image 35a (see FIG. 4 described later) that looks as if such image is picked up by the camera 21 shown in FIG. 1.

Now, assume that a position K (position at which the driver's own vehicle 20 is displayed in FIG. 3D) is set as the optimal starting position in step 3. Also, assume that a position A is set as the parking starting position from which the driver's own vehicle 20 comes up to the position K after the driver turns fully the steering wheel leftward and then backs the driver's own vehicle.

The driver's own vehicle 20 is positioned in parallel with other vehicle 31 at this position A. A relationship between the driver's own vehicle 20 and the above guide line 35 is given as shown in FIG. 3D when the driver's own vehicle 20 stops at the position A. If the parallel parking is started from this position A, the parking operation can be completed not to bring the driver's own vehicle 20 into contact with other vehicle 31.

In contrast, if the driver stops the driver's own vehicle at the position in front of the position A as the parking starting position and starts step 1, the driver's own vehicle 20 touches other vehicle 31. A view in which the backward image picked up by the camera 21 is displayed on the monitor screen in the situation that the driver's own vehicle is stopped at the position in front of the position A is FIG. 4. An other vehicle image 31a of other vehicle 31 and the above guide line image 35a are displayed on a monitor screen 36.

Figure 4:
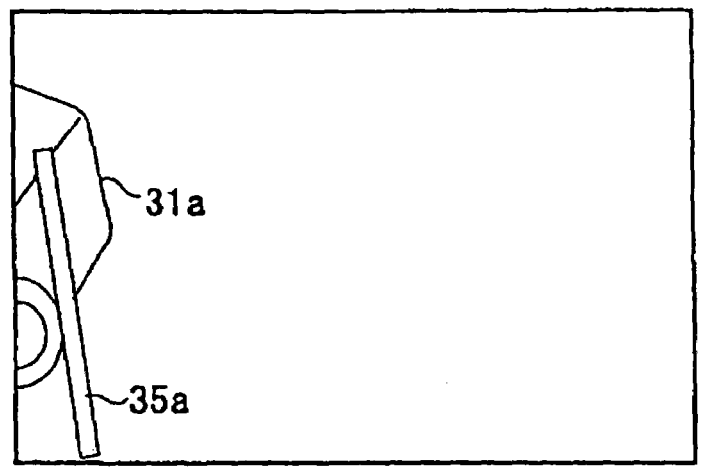
FIG. 4 is a view showing an example of a monitor screen of the parking assistance system according to the first embodiment of the present invention.

Like the monitor screen 36 in FIG. 4, when the guide line image 35a overlaps with the other vehicle image 31a, the driver's own vehicle 20 must be backed to the position at which the guide line image 35a comes apart from the other vehicle image 31a, i.e., the starting position in step 1 (parking starting position).

Since the guide line image 35a, i.e., the guide line 35 shown in FIG. 3D is in parallel with the straight backing direction in step 2 (the direction inclined by almost 45 degrees to the road direction), a positional relationship between the guide line 35 and other vehicle 31 is in no means changed. In other words, the driver's own vehicle 20 is positioned at the position B that is parallel with the position A along the guide line 35 and is further away from other vehicle 31. Then, the straight backing distance in step 2 is merely lengthened if step 1 is started by setting the parking starting position to the position B, nevertheless the front left corner portion of the driver's own vehicle never comes into contact with other vehicle 31 if step 3 is executed, which is the same as the case that the parking operation is started from the position A.

The relationships between the ideal starting position A of the parallel parking, in which the driver's own vehicle does not touch other vehicle 31 even if step 3 is executed, and the position B parallel with the position A and the guide line 35 are previously decided on the basis of a size of the driver's own vehicle 20, a dimension of a minimum turning radius, etc. For this reason, it may be previously decided on which area of the monitor screen 36 the guide line image 35a should be displayed to search the position, from which step 1 of the parallel parking is started, while the driver backs straight the driver's own vehicle in parallel with the adjacent vehicle.

In this manner, as shown in FIG. 4, if the guide line image 35a decided previously on the basis of a size of the driver's own vehicle, etc. is superposed on the image picked up by the camera and displayed on the monitor screen 36, it is possible for the driver to easily decide the starting position of step 1. That is, the position at which the guide line image 35a is apart from the other vehicle image 31a by straight backing the driver's own vehicle 20 indicates that other vehicle 31 is positioned in front of the guide line 35, and also indicates that the driver's own vehicle 20 does not touch other vehicle 31 if the parallel parking operations are carried out.

Then, when the guide line image 35a comes apart from the other vehicle image 31a, the driver turns fully the steering wheel leftward and then backs the driver's own vehicle until the driver's own vehicle is positioned in parallel with the guide line image 35a. However, the guide line image 35a is a fixed guide display (in an example shown in FIG. 4, the guide display always indicates a predetermined leftward-inclined backward direction of the driver's own vehicle). Therefore, if the driver's own vehicle 20 starts to turn, the driver cannot see whether or not the driver's own vehicle 20 is directed in parallel with the direction of the guide line image 35a being displayed prior to this turning on the monitor screen 36.

However, the driver can check whether or not the driver's own vehicle is positioned in parallel with the guide line 35, by actually looking at the relationship between other vehicle 31 and the road with the eye without monitoring of the monitor screen 36. Thus, the driver can easily know whether or not the driver's own vehicle is set in parallel with the guide line 35, i.e., the driver's own vehicle is set to incline by 45 degrees, e.g., to the road, etc. Also, at this time, change in an angle of the driver's own vehicle 20 may be measured by installing a gyro sensor, or the like into the driver's own vehicle 20, and then the driver may be informed of a final point of operations in step 1 by sound, or any final report may be displayed on the monitor screen.

Then, the driver straight backs the driver's own vehicle 20 up to the position K by executing step 2. Based on whether or not a distance between the vehicle locus 34 displayed on the monitor screen 36 and the side line 32 of the parking space 30 reaches a predetermined distance, it may be decided whether or not the driver's own vehicle 20 reaches the position K, i.e., the execution starting position of step 2. Then, if the driver's own vehicle comes up to the position K, the driver turns the steering wheel rightward to its maximum and then backs until a side surface of the driver's own vehicle 20 is positioned in parallel with the side line 32 of the parking space 30. Now, the parallel parking is completed.

According to the present embodiment, the driver can exactly judge the parking starting position, from which the parallel parking can be started not to touch other vehicle parked in front of the parking space of the driver's own vehicle, without installation of the steering sensor or execution of the locus computing process to display the locus, and also the driver can perform the parking operations without anxiety. As a result, the parking assistance system can be achieved at a low cost.

In addition, in the present embodiment, the parallel parking can be carried out only by three operations of the straight backing operation, the backing operation while turning the steering wheel leftward to its maximum, and the backing operation while turning the steering wheel rightward to its maximum. As a result, it is possible for the beginner to execute easily the parallel parking.

(Second Embodiment)

Next, a second embodiment of the present invention will be explained hereunder.

In the above first embodiment, only the guide line image 35a corresponding to the guide line 35 shown in FIG. 3D is displayed as the guide line image on the monitor screen. In the present embodiment, an auxiliary guide line image that makes it possible for the driver to exactly decide the position K in FIG. 3D (the optimal starting position in step 3) is also displayed in addition to the guide line image 35a.

Figure 5:
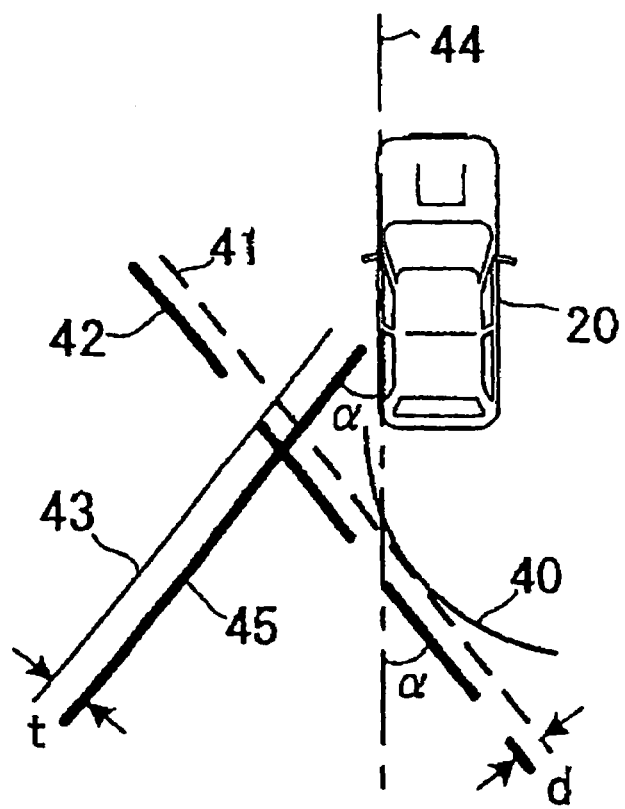
FIG. 5 is an explanatory view showing the guidance used in a parking assistance system according to a second embodiment of the present invention.

In the driver's own vehicle 20 shown in FIG. 5, an outer predictive locus 40 of the driver's own vehicle 20 given when the driver backs the driver's own vehicle 20 while turning the steering wheel is computed (in order to explain the guide display for assisting the parallel parking onto the left side, only the predictive locus 40 given when the driver turns the steering wheel rightward to its maximum is shown in FIG. 5. The guide display for assisting the parallel parking onto the right side can be easily obtained by replacing the left side with the right side in the following explanation.). Then, a tangent line 41 to the predictive locus 40 is sensed and then a line 42 that is separated from this tangent line 41 to the outer side by a predetermined distance d is sensed.

The tangent line 41 is a tangent line at a point at which a center line of the driver's own vehicle 20 intersects with the predictive locus 40, for example. The predetermined distance d is set to a distance d shown in FIG. 7D, i.e., a distance between the left side surface of the driver's own vehicle at the end of the parallel parking and the side line 32 of the road.

Also, assume that an angle of the line 42 to the center line of the driver's own vehicle 20 is defined as a (in FIG. 5, this angle is depicted as an angle to a straight line 44 along the left side surface of the body that is parallel with the center line), a line 45 inclined in the opposite direction by the equal angle α with respect to the line 44 is sensed, and also a line 43 separated forward from the line 45 in parallel by a predetermined distance t is sensed.

The longitudinal position of the line 45 to the driver's own vehicle 20 is decided by the similar way to the guide line 35 in the first embodiment. That is, the line is decided as a line that indicates a boundary of a range in which the driver's own vehicle 20 never absolutely touches other vehicle 31 when the driver's own vehicle 20 is positioned in parallel with the line 45 by turning fully the steering wheel leftward and then the front portion of the driver's own vehicle 20 is swung in the left direction by fully turning the steering wheel rightward.

In the present embodiment, the line 43 that is separated from this line 45 by a distance t as a margin is sensed, and then this line 43 is used in place of the guide line 35 in the first embodiment. That is, in the present embodiment, the lines 42, 43 which are previously decided in an above-mentioned manner are used as the guide line, and then guide line images 42a, 43a which have been obtained by picking up these lines 42, 43 by the camera 21 are superposed and displayed on the monitor screen 36 in FIG. 6.

Next, parallel parking procedures using the guide line images 42a, 43a will be explained with reference to FIGS. 7A to 7D hereunder. The parking operations using the guide line image 43a is similar to the example using the guide line image 35a, and are used as a guide to know the parking starting position in step 1. However, in the present embodiment, since a margin of the distance t shown in FIG. 5 is provided, a safety from the contact to other vehicle 31 is further enhanced.

Figure 6:
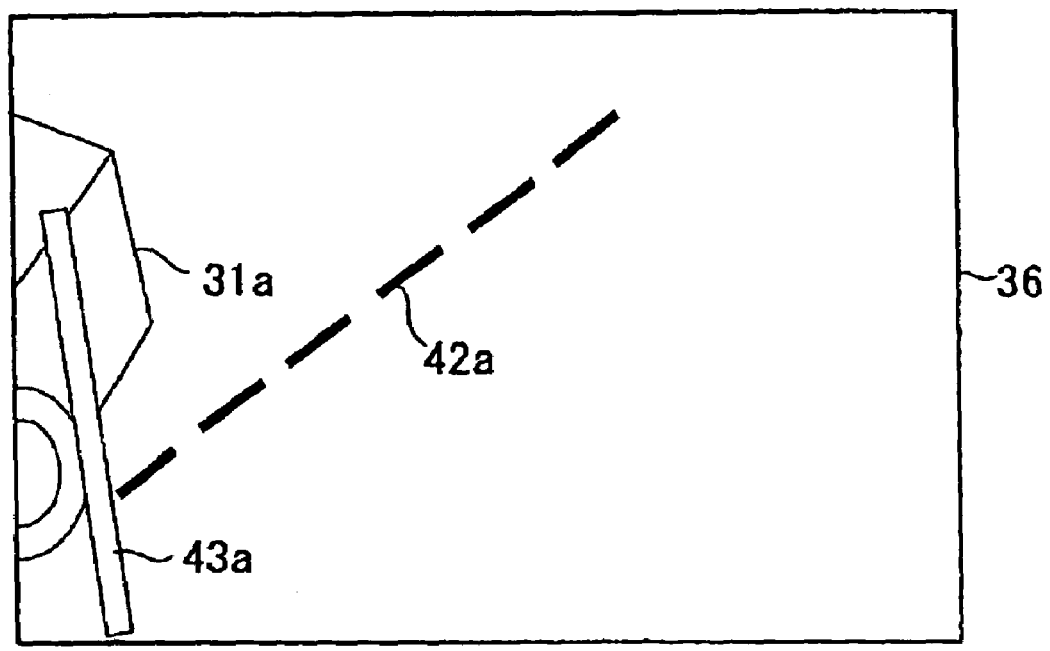
FIG. 6 is a view showing an example of a monitor screen of the parking assistance system according to the second embodiment of the present invention.

In the present embodiment, step 1 is started at a point of time when the guide line image 43a shown in FIG. 6 comes apart from the other vehicle image 31a (FIG. 7A), and then the driver turns the steering wheel leftward fully and then backs the driver's own vehicle. In the first embodiment, the end position of the operation in step 1 is decided by checking directly with the eye the fact that the driver's own vehicle is inclined by about 45 degrees to the road. However, in the present embodiment, it becomes possible to decide on the monitor screen 36 whether or not the guide line image 42a becomes parallel with the image of the side line 32 of the road (FIG. 7B).

Step 1 is ended at a point of time when the guide line image 42a becomes parallel with the image of the side line 32 of the road, and step 2 is started. In other words, the steering wheel is returned straight and then straight backs the driver's own vehicle. The driver's own vehicle is backed until the guide line image 32a coincides with the image of the side line 32 of the road (FIG. 7C). When both images coincide with each other, the end position of step 2, i.e., the start position of step 3 is sensed.

When the start position of step 3 is sensed, then the driver fully turns the steering wheel rightward and then backs the driver's own vehicle, as shown in FIG. 7D. At the time of this backing, the front portion of the driver's own vehicle 20 is largely swung leftward and comes close to other vehicle 31. Since the locus is positioned at the rear of the line 43 shown in FIG. 7A, the front portion never touches other vehicle 31. In the present embodiment, since the margin of the predetermined distance t explained in FIG. 5 is provided, the contact can be avoided with a margin even if step 1 is started immediately after the guide line image 43a shown in FIG. 6 comes apart from the other vehicle image 31a.

This backing in step 3 is executed until the direction of the driver's own vehicle 20 becomes parallel with the side line 32 of the road. A clearance of the above distance d still remains between the driver's own vehicle 20 and the side line 32 of the road at the end position in step 3.

Figure 10:
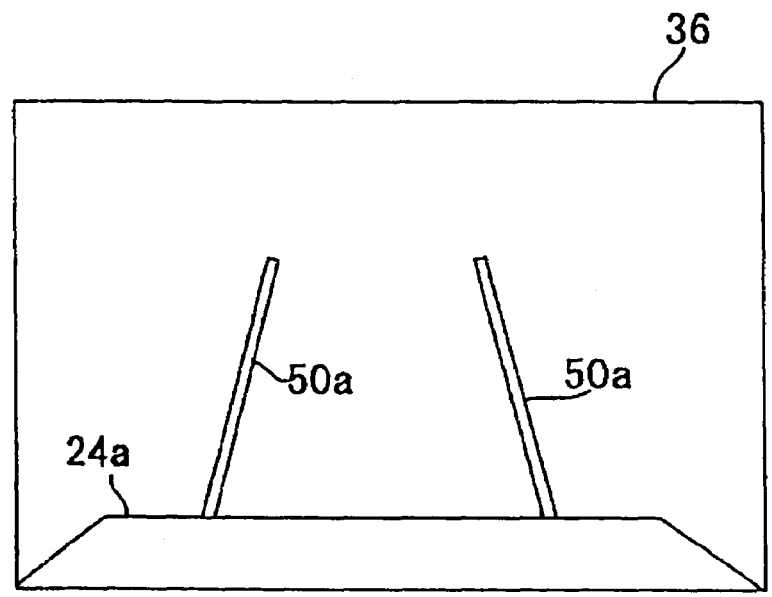
FIG. 10 is an explanatory view showing an auxiliary guidance used in the parking assistance system according to the second embodiment of the present invention.
Figure 11:
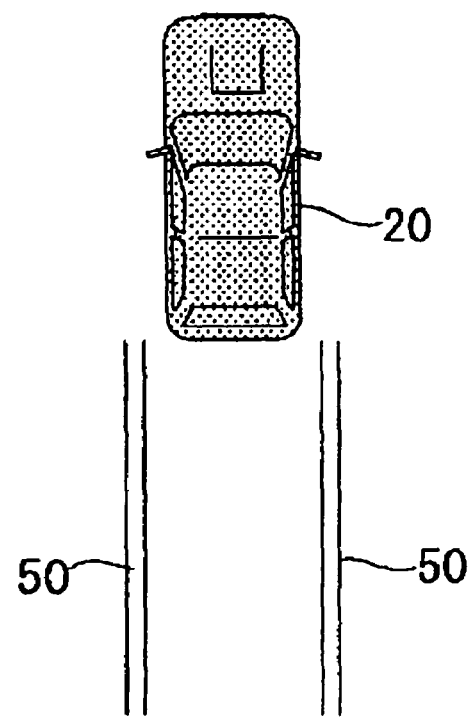
FIG. 11 is a view showing a monitor screen display of the auxiliary guidance used in the parking assistance system according to the second embodiment of the present invention.
Figure 12:
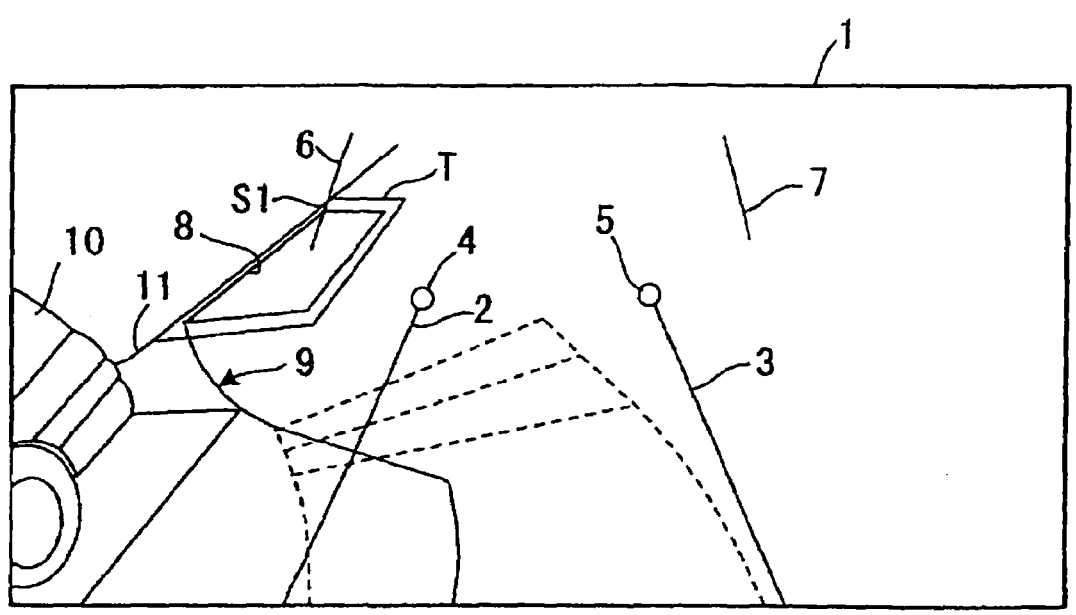
FIG. 12 is a view showing an example of a monitor screen of the parking assistance system in the related art.

In this case, the end position in step 3, i.e., the position at which the driver's own vehicle 20 is in parallel with the side line 32 of the road is directly decided with the eye. A guide line image for assisting this decision can also be displayed on the monitor screen 36. For example, as shown in FIG. 11, guide line images 50a corresponding to two straight lines 50, which are parallel with the driver's own vehicle 20 and are arranged slightly wider than the width of the vehicle, are superposed on the backside of the driver's own vehicle 20 and displayed on the monitor screen 36 in FIG. 10. A reference 24a shown in FIG. 10 denotes an image of the rear bumper 24 shown in FIG. 1.

If the wide-angle camera is used as the camera 21 shown in FIG. 1, the guide line images 50a displayed on the monitor screen 36 displaying the straight lines on a real space (the straight lines 50 shown in FIG. 11) are curved due to the influence of lens distortion. Since the monitor screen 36 is hard to look at accordingly, correction should be applied by providing a device for correcting the lens distortion in the controlling means 22 shown in FIG. 1 such that the straight lines such as the linear guides, the side line 32 of the road, etc. can be displayed as the straight lines as they are.

In this manner, according to the present embodiment, since the guide line image 42a as well as the guide line image 43a is superposed and displayed on the monitor screen, it is possible for the driver to easily decide not only the start position of step 1 but also the start position of step 3. In addition, since the predetermined distances t, d explained in FIG. 5 are provided, the driver can avoid the contact with other vehicle parked in front of the driver's own vehicle and the shoulder of a road with a margin even though the driver's attention is concentrated on the obstacles on the backside during the parallel parking.

Further, in the present embodiment, the guide displays used only when the steering operations during the parking operations are limited to the straight backing operation and the backing operation while turning the steering wheel leftward or rightward to its maximum are restricted. Therefore, such advantages can be achieved that the guide display can be provided quickly and simply, the driving operation based on the guide display can be simplified, and the stable parallel parking operations can be carried out.

(Third Embodiment)

Next, a third embodiment of the present invention will be explained with reference to FIG. 8 and FIGS. 9A to 9D hereunder. When the parallel parking is going to be executed, the parking space must be found between other vehicles that are parked in the parallel parking. However, if the found space is a very limited space as the parking space for the driver's own vehicle, it is difficult for the driver to decide whether or not the driver's own vehicle can actually park thereon. Therefore, in the present embodiment, a guide used to easily decide whether or not the driver's own vehicle can park on the space is superposed on the guide line image in the second embodiment and is displayed.

Figure 8:
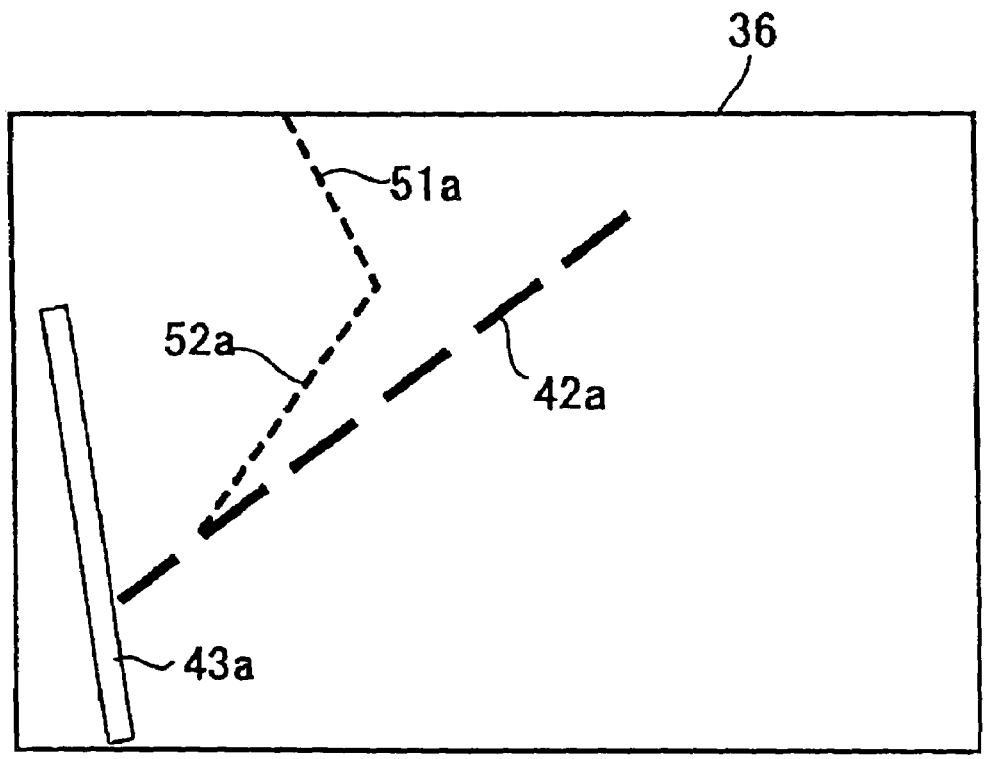
FIG. 8 is a view showing an example of a monitor screen of a parking assistance system according to a third embodiment of the present invention.

FIGS. 9A to 9D are explanatory views showing the guide line according to the third embodiment of the present invention. As shown in FIG. 9D, in the present embodiment, guide lines 51, 52 are used in addition to the guide lines 42, 43 used in the second embodiment shown in FIG. 7A. The guide line 51 is in parallel with the guide line 43 and indicates the backward position that is at the rear of the guide line 43 by a predetermined distance from a length of the driver's own vehicle 20. The guide line 52 to connect the guide line 43 and guide line 51 indicates a vehicle width from the side line 32 of the road, which is required for the parking of the driver's own vehicle 20. The guide lines 51, 52 are superposed as guide line images 51a, 52a that will be obtained when these guide lines are picked up by the camera 21 in FIG. 1, as shown in FIG. 8, and then displayed on the monitor screen 36.

If the backing operation in step 1 and step 3 is restricted to the backing operation at the maximum steering angle, the locus of the driver's own vehicle in these parking steps is decided uniquely. Therefore, the relationship between the starting position in step 1 and the final parking position is also decided uniquely according to the straight operation in step 2. The final parking position obtained when the starting position in step 1 is decided corresponds to the passing area when the driver's own vehicle is moved in parallel with the guide line 43. As a result, if the guide line 51 is constructed by the straight line, such guide line 51 becomes in parallel with the guide line 43.

Vehicle positions x, y, z shown in FIG. 9D shows final reaching positions when the driver's own vehicle 20 is parked in compliance with steps 1,2 and 3 respectively. The position x is the optimal final parking position, and the positions y, z are the final parking positions given when the driver takes the wrong straight backing distance in step 2. In this manner, even though the driver selects the wrong straight backing distance in step 2, the final parking positions are only deviated in parallel along the guide line 51. Therefore, the driver's own vehicle does not touch to other rear vehicle 53 as far as this other rear vehicle 53 is parked at the rear side rather than the guide line 51.

Therefore, as shown in FIG. 9C, it is understood that, in the situation that other vehicles 31, 53 are parked on the left side of the road and the starting position in step 1 is decided by the guide line 43 to park the driver's own vehicle on the space between other vehicles 31, 53, the driver's own vehicle touches other rear vehicle 53 when the guide line 51 overlaps with other rear vehicle 53.

Similarly, as shown in FIG. 9B, it is understood that, in the situation that the position of the driver's own vehicle 20 is adjusted not to touch other rear vehicle 53 such that other rear vehicle 53 is positioned at the rear of the guide line 51, the driver's own vehicle touches this other vehicle 31 when the guide line 43 overlaps with other vehicle 31 that is parked in front this parking space.

For this purpose, as shown in FIG. 9A, based on whether or not other rear vehicle 53 is positioned at the back of the guide line 51 when other front vehicle 31 is set in front of the guide line 43 by backing the driver's own vehicle 20 in parallel with other vehicle 31 that is now parked, it can be decided whether or not the driver's own vehicle 20 can be parked on the space 30 between other parking vehicles 31, 53. That is, it can be decided that, when on the monitor screen 36 in FIG. 8 the image of other vehicle 31 does not overlap with the guide line image 43a and also the image of other vehicle 53 does not overlap with the guide line image 51a, the driver's own vehicle 20 can be parked on the space 30 between other parking vehicles 31, 53.

In this manner, according to the present embodiment, if merely the driver's own vehicle 20 is stopped in parallel with other vehicle 31, which is now parked in front of the parking space, and then the driver's own vehicle is moved straight back and forth as it is, it is possible for the driver to exactly decide prior to the parking operations whether or not the driver's own vehicle can be parked on the target parking space.

In this case, the guide line images 51a, 52a are given by a dotted-line display on the monitor screen 36 in FIG. 8. For example, inner areas surrounded with the guide line images 51a, 52a may be displayed by the coloring, or the like, and are not always displayed by the line. Also, the guide line image 52a corresponding to the guide line 52 is not always needed and may not be displayed on the monitor screen.

As described above, according to the above embodiments, such an advantage can be achieved that, if merely the driver's own vehicle is stopped in parallel with other vehicle, which is being parked in front of the parking space, and then the driver's own vehicle is moved straight back and forth as it is, the driver can exactly decide via the monitor screen whether or not the driver's own vehicle can be parked on the target parking space. Also, another advantage can be achieved that the driver can decide a contact possibility of the front corner portion of the driver's own vehicle, prior to the start of the parking operation by using the camera for picking up the backward image.

In addition, according to the present embodiments, since all the guides used in the parking operations are constructed by the straight line and also the operations are simplified only to mate their positions and their directions, an effect can be attained that the driver can intuitively and easily catch the relationship between the image picked up by the camera and the guides. Also, since the steering operations during the parking operations are restricted to three operations of the straight driving and the operation for turning the steering wheel rightward or leftward to its maximum, it is easy for the driver to understand them and the exact steering operation can be implemented. As a result, it is possible for the beginner driver to carry out the parallel parking without fail.

With the above, for the sake of understanding of the technology of the present invention, the present invention is explained based on the best mode, but the present invention is not limited only to the exemplified embodiments. The present invention can be implemented by varying particular configurations within the matters set forth in individual claims.

This application was made based on Japanese Patent Application No.2002-103804 filed on Apr. 5, 2002, and the content thereof is incorporated hereinto by the reference.

<Industrial Applicability>

According to the present invention, a parking assistance system that makes it possible to intuitively decide a possibility of contact of a front left or right corner portion of driver's own vehicle with a surrounding vehicle or an obstacle and exactly decide a steering point of a steering wheel during a parallel parking and also makes it possible even for the beginner driver to intuitively execute the parallel parking with a sense of security can be provided. Also, according to the present invention, a parking assistance system can be provided at a low cost since a steering sensor is not used, a complicated locus computation is not required, etc.

What is claimed is:

1. A parking assistance system comprising:
   imaging means for picking up a backward image of a vehicle;
   monitoring means for displaying an image picked up by the imaging means; and
   controlling means for superposing an image of a tangent line of a boundary line of an area through which the vehicle may pass when a steering wheel of the vehicle is operated, or a line which is at a predetermined distance outward from the tangent line as a first guide to display on the monitoring means.

2. The parking assistance system according to claim 1, wherein the controlling means includes means for superposing an image of a second guide line which has an inclination angle opposite in direction to an inclination angle of the first guide with respect to a center line in a longitudinal direction of the vehicle, or a line which is at a predetermined distance for the second guide line in direction apart from the vehicle to display on the monitoring means.

3. The parking assistance system according to claim 1 or claim 2, wherein the area through which the vehicle may pass is an area through which a front left corner portion of the vehicle may pass when the vehicle parks in parallel on a left side, and an area through which a front right corner portion of the vehicle may pass when the vehicle parks in parallel on a right side.

4. The parking assistance system according to claim 1 or claim 2, wherein the area through which the vehicle may pass is an area through which the vehicle passes when the steering wheel is turned at a maximum steering angle.

5. A parking assistance system comprising:
   imaging means for picking up a backward image of a vehicle;
   monitoring means for displaying an image picked up by the imaging means; and
   controlling means for superposing an image of a tangent line of a boundary line of an area through which the vehicle may pass when a steering wheel of the vehicle is operated, or a line which is at a predetermined distance outward from the tangent line as a first guide to display on the monitoring means, and also superposing a second guide which is at a distance of one vehicle space backward from the first guide to display on the monitoring means.

* * * * *